Inventor
GEORGE J. AHLES,
By Kimmel & Crowell,
Attorneys.

April 18, 1939. G. J. AHLES 2,155,288
BOTTLE CAP MACHINE
Filed June 1, 1938 9 Sheets-Sheet 2

Inventor
GEORGE J. AHLES,
By Kimmel & Crowell
Attorneys

April 18, 1939.　　G. J. AHLES　　2,155,288

BOTTLE CAP MACHINE

Filed June 1, 1938　　9 Sheets-Sheet 6

Inventor
GEORGE J. AHLES,
By Kimmel & Crowell
Attorneys

April 18, 1939.                G. J. AHLES                2,155,288
                           BOTTLE CAP MACHINE
                   Filed June 1, 1938        9 Sheets-Sheet 8

GEORGE J. AHLES,
By Kimmel & Crowell,
Attorneys

April 18, 1939. G. J. AHLES 2,155,288
BOTTLE CAP MACHINE
Filed June 1, 1938 9 Sheets-Sheet 9

Inventor
GEORGE J. AHLES,
By Kimmel & Crowell
Attorneys

Patented Apr. 18, 1939

2,155,288

UNITED STATES PATENT OFFICE 2,155,288

BOTTLE CAP MACHINE

George J. Ahles, Rome, N. Y., assignor to Fort Stanwix Manufacturing Co., Inc., Rome, N. Y., a corporation of New York Application June 1, 1938, Serial No. 211,289

21 Claims. (Cl. 1—2)

This invention relates to capping machines and more particularly to an improved means for cutting and securing a lifting tab to a cap which is used on a bottle, paper receptacle or the like.

An object of this invention is to provide an improved means in the form of a tab cutting and stapling head which is so constructed as to progressively form a staple, cut off a predetermined length of tab and then staple the tab to the sheet from which the disc forming the cap is adapted to be blanked out.

Another object of this invention is to provide in combination a tab cutting and stapling means together with feeding means for the tab and feeding means for the wire from which the staple or staples are formed, the means being so constructed that one or more tabs may be stapled in a single operation depending upon the size of the closure or cap so that a single machine may be readily adjusted to meet the varying conditions arising from different sizes of caps which are to be formed by the blanking out portion of the machine with which the tab cutting and stapling mechanism is associated.

A further object of this invention is to provide an improved adjusting means for the combined stapling and cutting head or heads so that these heads or a single head may be accurately adjusted to secure the tab to the desired portion of the sheet from which the cap is cut out with a minimum of scrap material being formed from the sheet provided for the formation of the cap.

Still another object of this invention is to provide an improved head for the formation of the staple so that the staple will be formed after a predetermined length of wire has been cut off during one cycle of the movement of the head and the formed staple will then be automatically driven into the tab which is cut off substantially simultaneously with the driving of the staple into the cap sheet.

Another object of this invention is in the provision of an improved wire cutting means and staple forming means whereby the wire forming means consists of a pair of blades or slide bars which are so constructed that they may be interchanged one with another or that they may be ground off at their lower or cutting ends and then adjusted relative to the remaining mechanism in order that the staple cutting and forming means may be kept in such a condition as to cut off and form the staple in a proper manner.

A further object of this invention is to provide in a head of this kind an improved shearer for cutting off the tab which is so constructed as to permit the clean cutting of the strip from which the tab is formed.

A further object of this invention is to provide an improved staple forming means and a tab forming and cutting means which is so constructed that these means may be removed as a unit from the machine without disturbing the remaining parts of the machine.

A further object of this invention is to provide a device of this kind which will permit the speeding up of the cap forming operation, this being possible by reason of the cutting of the tab and the stapling thereof in a single stroke of the head operating means.

A further object of this invention is to provide an improved head supporting means and an operator therefor which is so constructed that the head or heads may be mounted on an oblique angle to the line of travel of the cap sheet, so that where at least 2 heads are attached these heads will be disposed one forwardly of the other and engageable with the supply sheet from which the cap is formed laterally of the other head so that the caps in one row will be staggered from the caps in the other row thus eliminating a considerable amount of scrap.

To the foregoing objects and to others which may hereinafter appear, the invention consists of the novel construction, combination and arrangement of parts as will be more specifically referred to and illustrated in the accompanying drawings, wherein embodiments of the invention are shown, but it is to be understood that changes, modifications and variations may be resorted to which fall within the scope of the invention as claimed.

Figures 1, 24, 25:
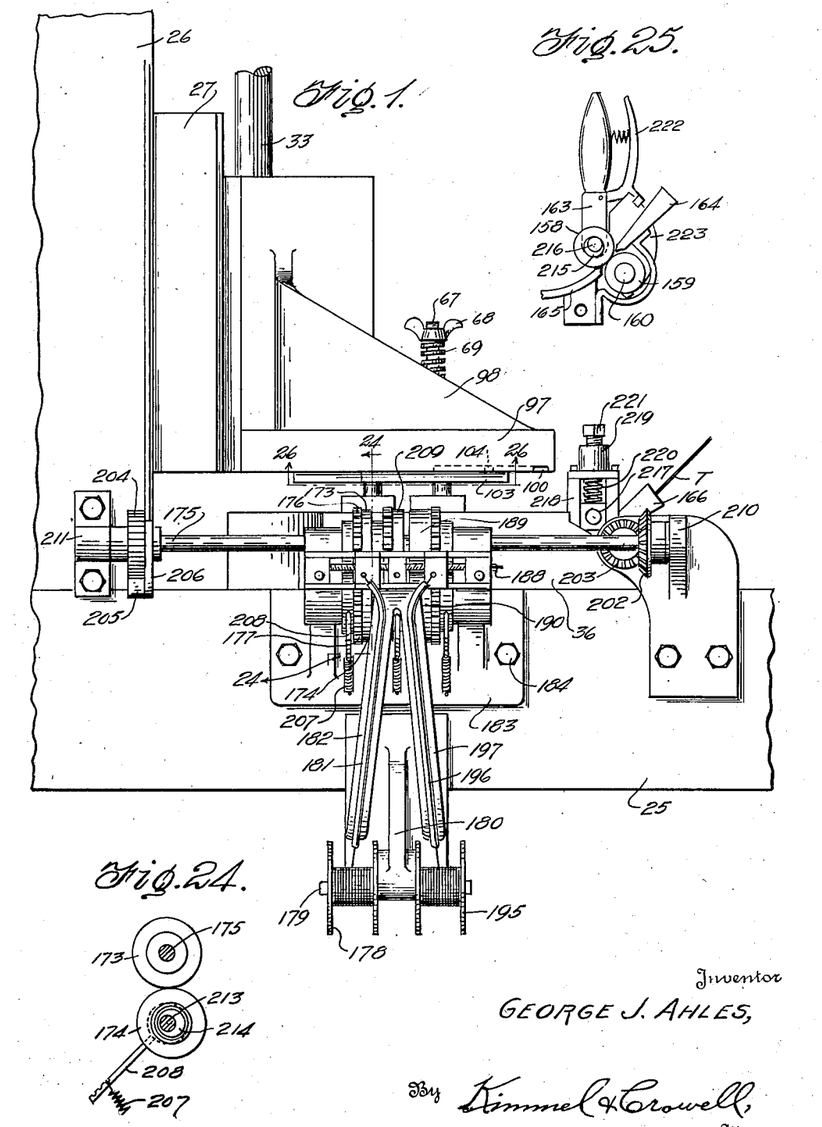
Figure 1 is a front elevation of the invention assembled.
Figure 24 is a fragmentary sectional view taken on the line 24—24 of Figure 1.
Figure 25 is a fragmentary sectional view taken on the line 25—25 of Figure 2.
Figures 2, 22, 23:
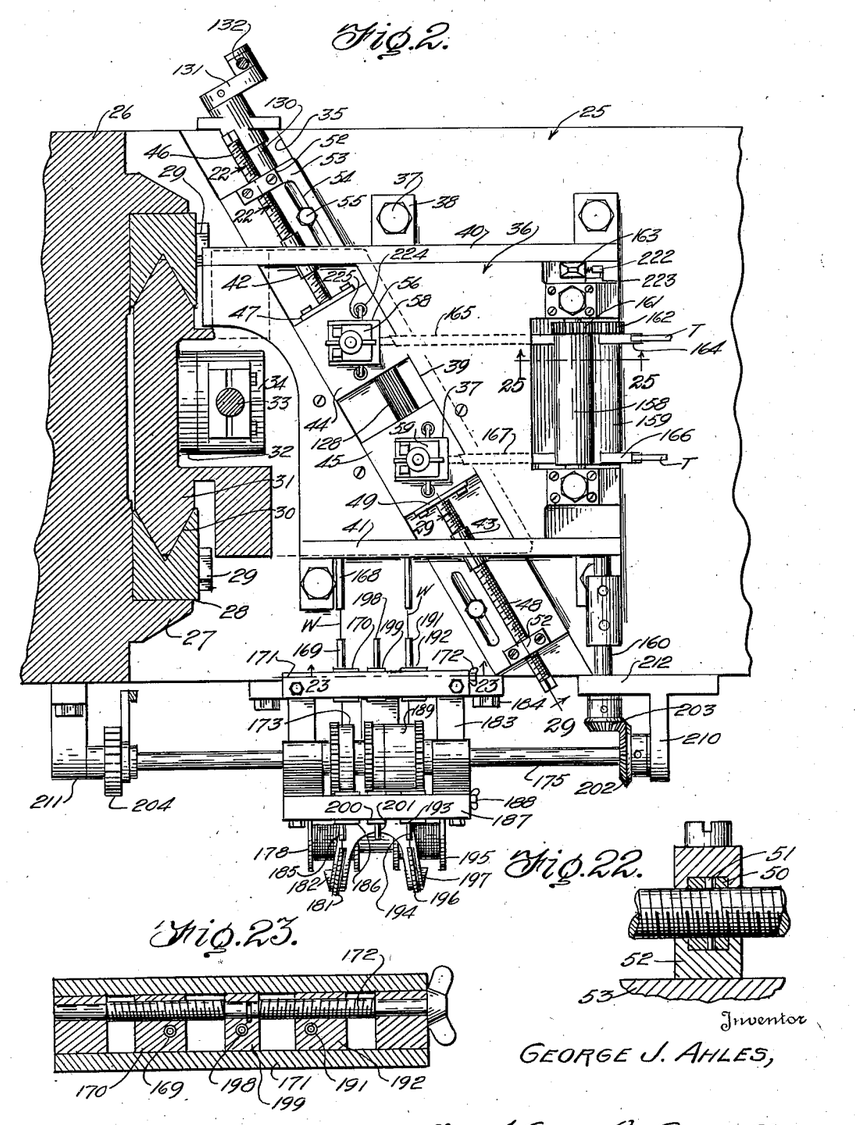
Figure 2 is an assembly view partly in plan and partly in section through the ram or plunger.
Figure 22 is a fragmentary enlarged sectional view taken on the line 22—22 of Figure 2.
Figure 23 is an enlarged fragmentary sectional view taken on line 23—23 of Figure 2.

Referring to the drawings, and first to Figures 1 and 2, the numeral 25 designates generally the frame of a machine having a means constructed according to an embodiment of this invention mounted thereon. The frame 25 is provided as shown in Figure 1 with an upstanding support 26 provided with a pair of vertically disposed spaced apart and outstanding guide supporting members 27. A guide bar or member 28 is adapted to engage against a supporting rail or member 27 and also against the adjacent face of the vertical supporting member 26. The guide member 28 is secured in vertical position by means of bolts 29. Each guide member 28 is provided in the vertical edge thereof with a V-shaped channel 30. A sliding head 31 slidably engages the guide channels or grooves 30 and is provided with a block 32 on the outer face thereof which is connected to a reciprocating operator 33. The operator 33 is adapted to be connected to a cam member carried by an operating shaft disposed above the slide member 31 so that by each rotation of the driving shaft and cam the operator 33 will be vertically reciprocated. The operator 33 is rockably connected to the block 32 by means of a bearing structure 34 carried by the lower end of the operator 33.

The frame 25 is provided in the upper surface thereof with a channel 35 which extends obliquely across the top of the frame 25, the angle of this channel 35 being substantially sixty degrees the purpose for which will be hereinafter described.

A stitcher base 36 is secured to the frame 25 by means of bolts 37 engaging through outstanding lugs 38 provided on the opposite sides of the base 36. The intermediate or central portion of the base 36 is disposed in upwardly spaced relation to the top of the frame 25 so as to provide a passageway between the under side of the base 36 and the top of the frame 25 through which the strip of cardboard or other like material used in forming the caps is adapted to pass. As viewed in Figures 1 and 2 the cap sheet moves from the right to the left. The base member 36 is provided with an elongated slot or guide opening 39 disposed on the same angle as the guide channel 35 and the end portions 40 and 41 of the base 36 are provided with threaded sleeves or bushings 42 and 43 respectively. A pair of slide blocks 44 and 45 are slidably mounted in the guide slot or channel 39 and these blocks 44 and 45 are adapted to be adjusted one relative to the other by an adjusting means comprising a screw 46 which has its inner end swivelly secured to the block 44 by means of a notched plate 47 carried by the block 44. The block 45 is adjusted by means of a screw 48 swivelly engaging a plate 49 secured to the block 45. The screw members 46 and 48 are identical in construction and the screw 46 has a collar 50 secured as by a pin 51 intermediate the ends thereof and this collar 50 is rotatably mounted in a bearing structure 52 carried by a slide or clincher plate 53. The slide plate 53 is slidable in the guide channel 35 and is provided with an elongated slot 54 therethrough and a bolt 55 engages through the slot 54 and is threaded into the top of the frame 25 so that the slide 53 can be adjusted longitudinally of the guide channel 35. The mounting for the screw 48 is similar in every detail as described for the screw 46. The head block 44 is provided with a vertically disposed opening 56 therethrough and the head block 45 is also provided with a vertically disposed opening 57. The openings 56 and 57 are substantially rectangular in plan and are disposed with opposite sides thereof parallel with the line of movement of the material beneath the base member 36. The block members 44 and 45 are adapted to have combined tab cutting or forming and staple stitching heads 58 and 59 respectively which are slidable in the openings 56 and 57 respectively. These heads 58 and 59 are identical in construction and the hereinafter described detailed construction of one of these heads will apply equally as well to the other of the heads.

Figure 14:
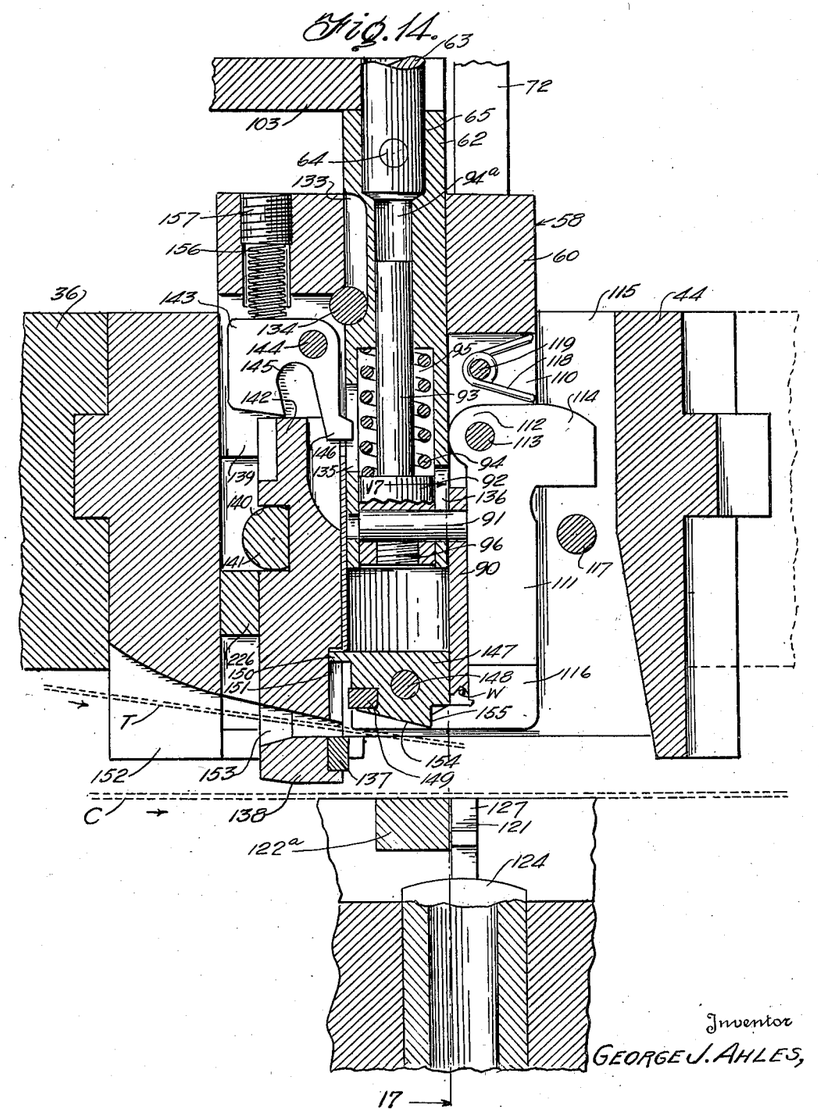
Figure 14 is an enlarged section on line 14—14 of Figure 7 and also showing certain associated parts of the device, the parts being shown in the normal position of the parts of the machine.
Figure 15:
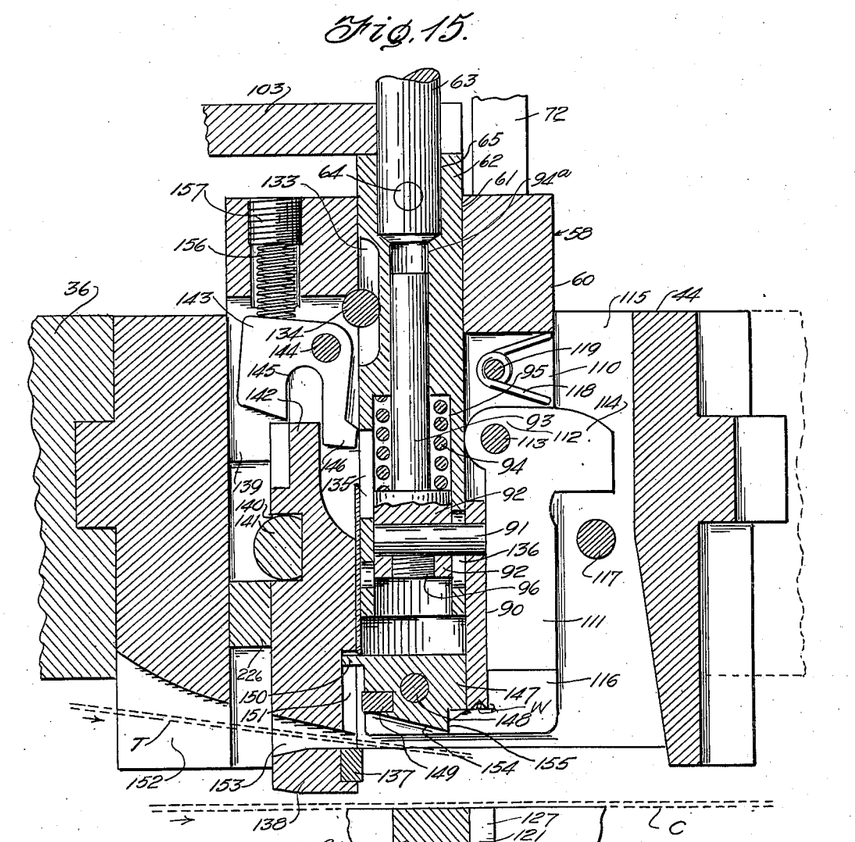
Figure 15 is a view similar to Figure 14 but showing the parts in the position assumed when a length of wire is severed and prior to the bending of the wire.
Figures 16, 26:
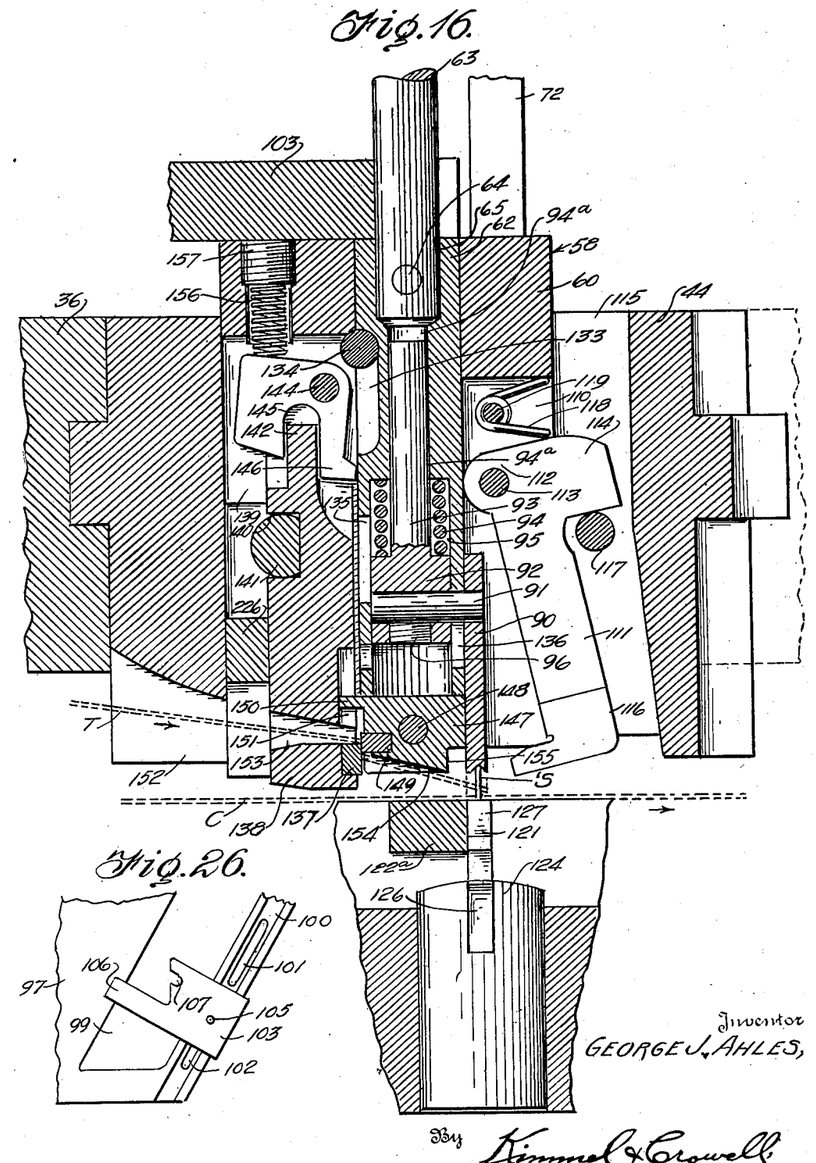
Figure 16 is a view of a further position of the parts shown in Figure 14, all parts being ready for the driving of the staple.
Figure 26 is a sectional view taken on the line 26—26 of Figure 1.

The head 58 is shown in more detail in Figures 14, 15 and 16. The head member 58 comprises a body or block 60 which is provided with a longitudinally disposed bore 61 extending vertically therethrough. A plunger 62 is slidable in the bore 61 and an upwardly extending rod or bar 63 is secured as by a pin 64 to the plunger 62 which is seated in a bore 65 provided in the upper end of the plunger 62. The bar or rod 63 is slidable through a block 66 and the upper end of the rod 63 is provided with threads 67 on which a wing nut 68 is threadably mounted. The wing nut 68 bears against the upper end of a compression spring 69 which at its lower end bears against the upper side of the block 66. The head member or body 60 is provided adjacent opposite sides thereof with guide channels 70 and 71 and vertically disposed staple cutting and forming bars 72 and 73 are slidable in the guide channels 70 and 71 respectively. The bars 72 and 73 are held in the channels 70 and 71 respectively by means of plates 74 and 75 respectively which are secured as by bolts 76 and 77 respectively. The staple forming and cutting members 72 and 73 are adjustably held with respect to the block 66 by providing teeth or serrations 78 and 79 on the bars 72 and 73 respectively. Holding plates 80 and 81 engage the serrations 78 and 79 and these plates or holding members 80 and 81 are secured in recesses 82 and 83 respectively which are formed in the opposite sides of the block 66. The holding plates 80 and 81 are held in the recesses 82 and 83 by bolts or screws 84 and 85 respectively.

Figure 13:
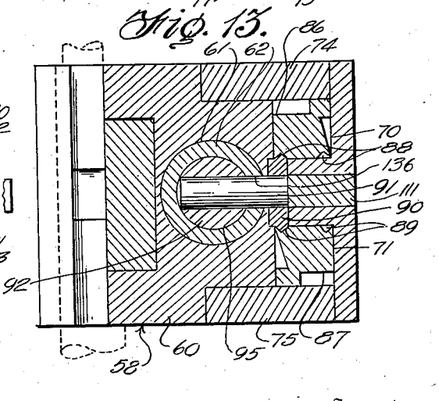
Figure 13 is an enlarged section on line 13—13 of Figure 3.

The lower portions of the bars 72 and 73 are formed with an inwardly offset wire cutting portion 86 and 87 respectively and these cutter portions are cut in from one side or edge of the respective bars as shown in Figure 13. These bars 72 and 73 are interchangeable one with another so that when one cutter portion of one bar becomes dulled, this bar may be interchanged with the other bar so that the cutter portion of this other bar may be used for the cutting of the wire. The bar 72 is provided adjacent the lower portion thereof with a pair of V-shaped grooves 88 disposed in parallel relation adjacent each longitudinal or vertical edge thereof and the bar 73 is also provided with a pair of guide grooves 89 which are disposed on the inner side thereof. A stapling driver head 90 is slidable in opposed guide grooves 88 and 89 and this driver 90 is secured as by a pin 91 to the lower end portion of an inner plunger 92. This plunger 92 is provided with a reduced stem portion 93 engaging in a bore 94a provided in the plunger 62 and a spring 94 is disposed in the plunger 62 engaging at one end against the inner end of a bore 95 provided therein and at the other end engaging against the inner end of the plunger 92. The spring 94 is adapted at a predetermined time in the operation of the head 58 to force the driver 90 downwardly and thus drive the staple S through the tab T which is formed by a tab forming or cutting means to be hereinafter described. The pin 91 is secured in the plunger 92 as by a set screw 96.

Referring now to Figure 1, the slide member 31 is provided with a horizontally disposed ram or operating member 97. This operating member 97 is constructed in the form of a horizontally disposed plate provided with a bracing member 98 and the ram or operating member 97 is provided with an elongated slot 99 therethrough which is disposed on substantially the same angle as the guide 35 and the guide 39. The ram or operating member 97 is provided with a groove or channel 100 in the under side thereof and is also provided with a pair of elongated slots 101 and 102 in that portion of the ram 97 outwardly of the opening 99 therein. A pair of head operating plates 103 are adapted to be secured to the ram 97, each plate 103 being provided with a key 104 in the upper side thereof which is engageable in the guide channel 100 and the plates 103 are held in adjusted position along the length of the guide channel 100 by means of a bolt 105 extending through the plate 103 and through a slot 101 or 102. The plate 103 is provided with an elongated arm 106 which extends across the opening 99 so that the free end of the plate 103 will be braced by the under side of the ram 97. The plate 103 is also provided with a slot 107 which is adapted to receive the bar or rod 63. The under side of the plate 103 is adapted to engage the upper end of the plunger 62 so as to move the plunger downwardly upon downward movement of the ram or operator 97. When the ram or operator 97 moves downwardly the spring 69 will maintain the block 66 in contact with the upper side of the plate 103 so that the staple forming bars 72 and 73 are moved downwardly by expansion of the spring 69. The distance between the upper end of the plunger 62 and the under side of the block 66 is slightly greater than the thickness of the plate 103 so that when the operator 97 is at its uppermost position or at the top of its stroke the under side of the plate 103 will be positioned in upwardly spaced relation to the upper end of the plunger 62. In this manner the initial downward movement of the plate 103 and the operator 97 will be followed by downward movement of the block 66 under the action of the spring 69 without initial movement of the plunger 62. The downward movement of the staple forming bars 72 and 73 will initially affect a cutting of a length of wire as shown at S in Figure 18.

Figures 17, 18, 19, 20, 21:
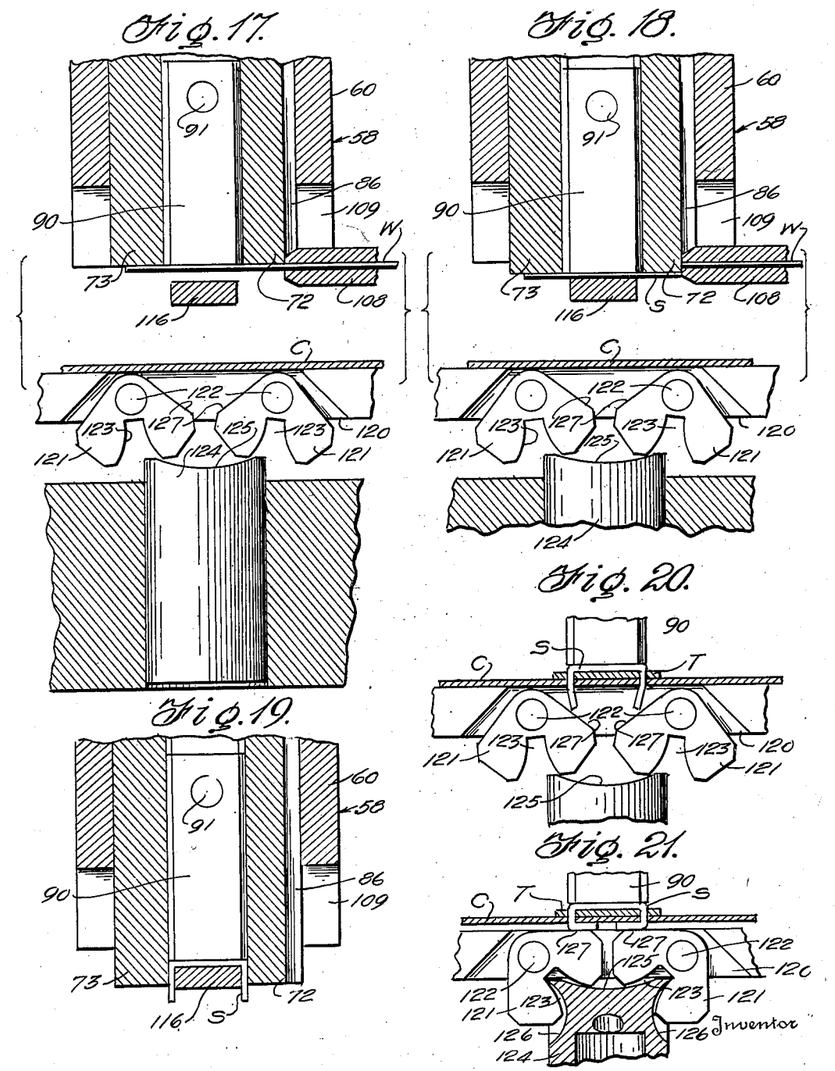
Figure 17 is a view substantially on line 17—17 of Figure 14 and showing the wire ready for severing.
Figure 18 is a view similar to Figure 17 but showing the wire severed and ready for bending.
Figure 19 is a detail view showing the bending of the wire.
Figure 20 is a detail view showing the staple driven, but not yet clinched.
Figure 21 is a detail view showing the staple clinched.
Figure 27:
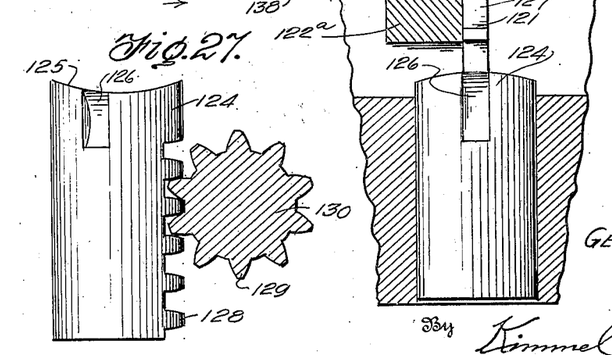
Figure 27 is a fragmentary sectional view showing the operating means for the clinched dogs.
Figure 28:
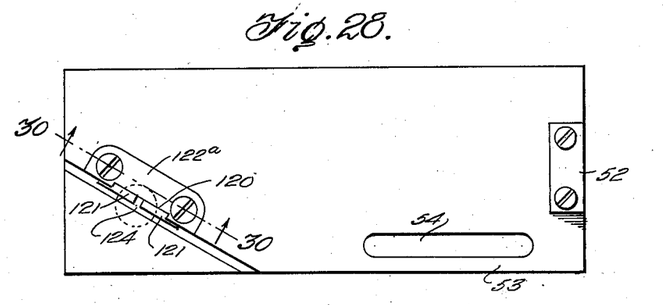
Figure 28 is a detail top plan of one of the clincher plates.
Figure 29:
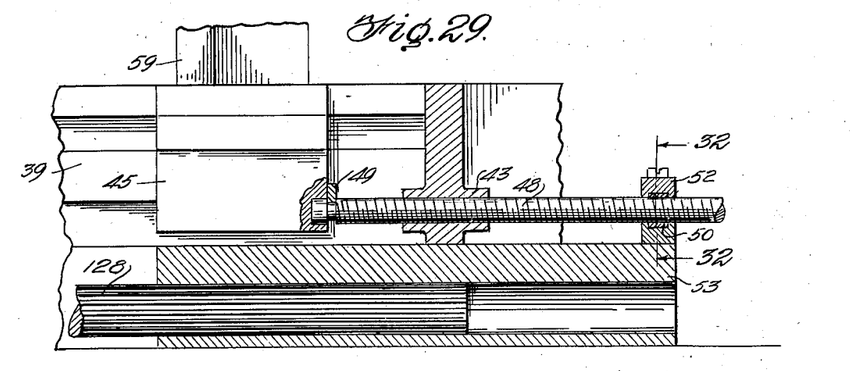
Figure 29 is a fragmentary longitudinal section taken on the line 29—29 of Figure 2.
Figure 30:
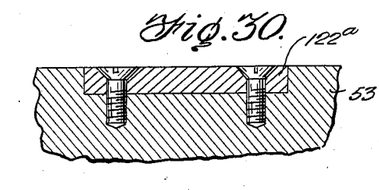
Figure 30 is a fragmentary sectional view taken on the line 30—30 of Figure 28.
Figure 31:
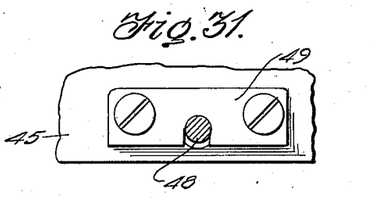
Figure 31 is a fragmentary sectional view showing the connection between the adjusting screw and the slide block.
Figure 32:
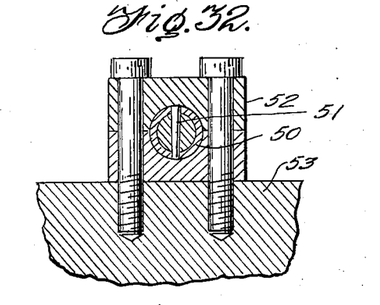
Figure 32 is an enlarged fragmentary sectional view taken on the line 32—32 of Figure 29.

The wire W passes through a guide tube 108 the inner end of which is formed as a stationary cutter so that the cutting side 86 of the blade or bar 72 will move downwardly across the inner end of the tube 108 and cut off the length of wire shown in Figure 18 which is formed into a staple. The wire guide tube 108 is secured in the block 44 adjacent the lower end of this block and the head 58 is provided with a recess 109 in the lower portion thereof through which the guide member 108 extends so that the head 58 may have relative movement to the block 44.

The head or body 60 is provided with an elongated opening or slot 110 in which a rock lever 111 is mounted. The rock lever 111 is provided with an inwardly extending boss 112 on its inner edge and a pin 113 engages through this boss 112 and through the body 60 so as to rockably mount the lever 111 in the slot or opening 110. The lever 111 at its upper end is provided with an outwardly extending arm 114 which projects into a vertically extending passage 115 provided in the block 44 laterally of the opening 56 therein so that the arm 114 may slide vertically relative to the block 44. The lower end of the lever 111 is provided with an anvil 116 which projects inwardly of the inner vertical edge of the lever 111 and extends underneath the staple driver 90 and between the staple forming bars 72 and 73. In this manner when the wire W is fed into the head 58 through the tube 108 the staple portion S thereof will be disposed above the anvil 116 as shown in Figure 17. Upon downward movement of the staple forming members 72 and 73 the top of the anvil 116 will form the bight of the staple and the parallel legs thereof will be formed by the bars 72 and 73 moving downwardly on opposite sides of the anvil 116 which at this time is stationary in the head 58. After the U-shaped staple has been formed with the parallel legs of the staple engaging in the V-shaped grooves 88 and 89 of the staple forming members 72 and 73 respectively, the head 58 will be moved downwardly with the block 44 stationary so that the releasing arm 114 of the lever 111 will contact with a releasing pin 117 which is mounted in the block 44 across the opening 115 therein. The lever 111 is biased to an operative position by means of a spring 118 which is carried by a pin 119 in the slot or opening 110. The spring 118 is substantially V-shaped as shown in Figures 14, 15 and 16 and engages the upper edge of the arm 114. When the anvil 116 is swung to a released position by means of the releasing pin 117, the spring 94 which at this time is under tension, will automatically force the driver 90 downwardly and drive the staple S through the tab T. The staple S will be held against tilting movement during the driving thereof by reason of the fact that the parallel legs of the staple engage in the grooves 88 and 89 of the staple forming bars 72 and 73.

The clincher plate 53 is provided below the head 58 with an opening 120 in which a pair of stapling dogs 121 are disposed. The stapling dogs 121 are pivotally mounted on pins 122 carried by a plate 122ª and each stapling dog is provided with divergent slots 123. A clinching dog operating member 124 is disposed below the two dogs 121 and is provided with an arcuate upper surface 125 and recessed side portions 126 so that the slotted portion of each dog will be received in the arcuate portion 125 and the recessed portion 126 in order to rock the staple forming portion 127 of the dogs 121 upwardly into a substantially horizontal position as shown in Figure 21. The clinching head or operating member 124 is provided with teeth or serrations 128 on a side thereof which mesh with teeth 129 carried by a clinching shaft 130. The clinching shaft 130 has a crank 131 secured to one end thereof and an operating member 132 is pivotally secured to the crank 131 and is connected by a link structure to the overhead operating shaft (not shown). The shaft 130 extends longitudinally of the guide 35 as shown in Figure 2 below the blocks 44 and 45 and is rockably mounted in the clincher plate 53.

When the plate 103 moves downwardly the under side thereof will engage the plunger 62 and move the plunger 62 downwardly in the head 58. The plunger 62 is provided at a point adjacent the upper portion thereof with a longitudinally extending recess 133 and a pin 134 carried by the head 58 engages in the recess 133. At the time the plunger operating plate 103 initially engages the plunger 62 the plunger 62 is in an uppermost position with the lower end of the recess 133 engaging the pin 134. The plunger 62 is also provided below the recess 133 with a longitudinally extending slot 135. The plunger 62 is also provided on the side opposite from the slot 135 with a slot 136 through which the pin 91 engages so that the plunger 62 may have movement independent of the pin 91 and the driver 90.

A substantially stationary cutter 137 is mounted in the lower portion of a supporting member 138 which is disposed in a recess 139 provided in the head 58. The blade supporting member 138 is provided with a transversely disposed recess 140 through which a pin 141 extends. The pin 141 is carried by the block 44 and is provided for the purpose of holding the blade supporting member 138 against movement relative to the block 44. The supporting member 138 at its upper end is provided with a reduced portion 142 which is offset laterally from the inner vertical edge thereof and from the slot 135. A releasing and locking dog 143 is mounted in the recess 139 being pivoted on a pin 144 carried by the head 58. The dog 143 is provided with a slot 145 extending upwardly from its lower edge in which the reduced portion 142 of the blade supporting member 135 is adapted to engage when the pawl 143 is in released position. The pawl or dog 143 is provided with an inwardly extending lug 146 which is adapted to engage in the slot 135 of the plunger 62 when the plunger 62 is in its uppermost position. The upper face of the lug or cam 146 is inclined to the vertical so that when the plunger 62 moves downwardly the upper cam face thereof will engage the upper end of the slot 135 so that the dog 143 will be rocked on the pivot 144 to a position where the slot 145 will be in alignment with the reduced upper end portion 142 of the blade supporting member 138. In this position the head 58 may be moved downwardly in the block 44.

A block 147 is mounted in the lower portion of the head 58 below the lower end of the plunger 62 being disposed in the lower end of the bore 61 thereof. The block or movable blade supporting member 147 is held against movement relative to the head 58 by means of a pin 148 extending horizontally through the block or supporting member 147. A blade 149 is carried by the supporting member 147 in a position to confront the blade 137 so that when the plunger 62 moves downwardly, the lower end of the plunger 62 will engage the upper side of the supporting member 147 and move the head 58 downwardly so as to carry the blade or cutter 149 past the cutter or blade 137. The supporting member 147 is provided with an extension 150 which slidably engages in a vertically disposed recess 151 provided in the inner face of the blade supporting member 138.

The block 44 is provided on its under side with a groove 152 through which the tape T engages and the blade supporting member 138 is provided with an opening 153 therethrough so that the tape T may extend through the supporting member 138 above the blade 137. The under side or lower end of the supporting member 147 is cut off as at 154 on an angle substantially coincident with the angle of the upper face of the opening 153 in the supporting member 138, the face 154 being inclined downwardly from the cutting edge of the blade 149. The supporting member 147 is also provided with a recess 155 on the side thereof confronting the anvil 116 so that the bill of the anvil 116 will be received in the recess 155.

The dog 143 is biased to a locking position by means of a spring 156 which may be tensioned by a bolt or a screw 157 which is threaded into the head 58 through the upper end thereof.

The cutters 137 and 149 are adapted to cut off a predetermined length of tape from the supply strip which is fed through the guide openings 152 and 153 and substantially simultaneously with the cutting off of the tab T the staple driver 90 will be released by means of the releasing pin 117 as shown in Figure 16. At this time the blade 149 moves downwardly past the blade 137 cutting off the tab T and at substantially the same time the spring 94 forces the plunger 92 carrying the driver 90 downwardly so as to drive the staple S through the tab T and also through the cap sheet C. The staple S is then clinched on the cap sheet C by the clinching means hereinbefore described.

The tab strip is fed to the head 58 by means of a plurality of feeding rolls 158 and 159 which are driven from a shaft 160. The upper roll 158 is provided at one end thereof with gear teeth 161 meshing with gear teeth 162 disposed at the same end of the roll 159. Preferably, the upper roll 161 is mounted for movement toward or away from the lower roll 159 under the action of a roll tensioning lever 163. A tape guiding member 164 is supported on the intake side of the rolls 158 and 159 so as to feed the tape T between the two rolls and a tubular guide member 165 extends outwardly of the discharge side of the rolls 158 and 159 and extends to a point closely adjacent the head 58. This tube 165 extends below the base 36 and above the cap sheet C. The tape guiding tubes 164 and 165 are preferably mounted on a single support and are adapted to be shifted longitudinally of the rolls 158 and 159 so as to compensate for the shifting of the head supporting block 44 under the action of the adjusting screw 46. The head 59 has guiding tubes 166 and 167 associated therewith similar to the guide tubes 164 and 165 and these guide tubes 166 and 167 are secured to a common base or supporting member and are also mounted for adjustment lengthwise of the feeding rolls 158 and 159 to compensate for the adjustment of the head supporting block 45.

The wire W is fed to the head 58 through a guide tube 168 which is disposed in alignment with a guide tube 169 carried by a block 170. The block 170 is adjustably carried by a guide means 171 being adjustable longitudinally of the guide means 171 by means of an adjusting screw 172. A pair of wire feeding rolls 173 and 174 are adapted to feed the wire through the guide tube 169. The feeding roll 173 is mounted on a drive shaft 175 and a gear 176 carried by the shaft 175 meshes with a gear 177 mounted on the same shaft as the roll 174 so as to drive the roll 174 with the roll 173. A supply reel or drum 178 is mounted on a shaft 179 carried by a bracket 180 secured to the frame 25 and the wire from the drum or supply member 178 passes through a guide tube 181 engaging a resilient arm 182 which is fixed to the supporting bracket 183. The bracket 183 carries the shaft for the lower feeding roll 174 and this bracket 183 is bolted as by bolts 184 to the frame 25. A wire guide tube 185 is carried by an adjustable member 186 engaging in guide members 187 similar to the guide members 171. The block or tube supporting member 186 is adjustable lengthwise of the guide and supporting means 187 by an adjusting screw 188.

The head 59 is provided with a wire feeding means comprising upper and lower feeding rolls 189 and 190 respectively, the upper roll 189 being fixed to the shaft 175. A guide tube 191 is carried by an adjustable block 192 similar to the block 170 and a similar block 193 carries a tube guiding member 194. The wire for the head 59 is taken off of the supply reel 195 and passes through a tube 196 carried by a resilient arm 197 which is formed with the arm 182. In practice the two arms 182 and 197 are formed from a single piece of material and are disposed in outwardly divergent relation as shown in Figure 1 being bendable longitudinally as shown in Figures 1 and 2. The adjusting screws 172 and 188 are preferably provided with right and left hand threads so that rotation of these screws will move the blocks engaged therewith in opposite directions. A centrally disposed wire guiding tube 198 is carried by a block 199 engaging in the guide means 171 and a similar block 200 is disposed in the guide means 187 and is provided with a guide tube 201. The blocks 199 and 200 are preferably swivelly engaged with the adjusting screws 172 and 188 so that rotation of these screws will not effect movement of the blocks 199 and 200. The tubes 198 and 201 are used where a single stapling head is used in place of the two stapling heads 58 and 59.

The shaft 175 at one end thereof is provided with a bevelled gear 202 which is fixed thereto and which meshes with the gear 203 carried by the tape feeding shaft 160. The shaft 175 is also provided with a ratchet 204 and a dog 205 carried by a crank arm 206 meshes with the ratchet 204 so as to progressively rotate the shaft 175 and simultaneously feed the wire W and the tape T to the stapling heads 58 and 59. The crank or lever 206 is rocked by means of a link structure connected to the driving means (not shown). The feeding roll 174 is tensioned against the feeding roll 173 by means of a spring 207 which is fixed at one end to the base portion of the bracket 183 and which engages at the opposite end a selected notch in an outstanding arm or bar 208. The bar or rod 208 is fixed to the eccentric mounting for the roller 174. The roller 190 is tensioned by a similar means and the lower roller associated with the upper roller 209 for the central guide means 198 is also provided with a similar roller tensioning means to that shown for the roller 174. The shaft 175 is journalled in bearings 210 and 211 which are fixed to the frame 25 of the machine and the bearing 210 also carries a bearing 212 for the adjacent end of the shaft 160 as shown in Figure 2.

The rollers 174, 190 and the roller associated with roller 209 are rotatably mounted on eccentric sleeves or bearings 214 which are mounted on a shaft 213 journalled in the bracket 183. The tensioning rod 208 is secured to a sleeve 214 so that the spring 207 will rock or tend to rotate the eccentric sleeve 214 and thus swing the roller 174 in the direction of the roller 173.

The tape tensioning roller 158 is mounted on a shaft 215 which is provided at each end with eccentrically disposed trunnions 216 which are mounted in bearings 217. The bearings 217 are vertically movable in vertically disposed guide members 218 provided with a cap 219 and a spring 220 engages a bearing 217 and is tensioned by means of a threaded nut 221. The tensioning lever 163 is secured to one end of the shaft 215 and is provided with a spring pressed pawl 222 which engages in a selected notch of a stationary quadrant 223 so that the upper roll 158 may be tensioned against the lower roll 159 or moved to a released position.

Figure 3:
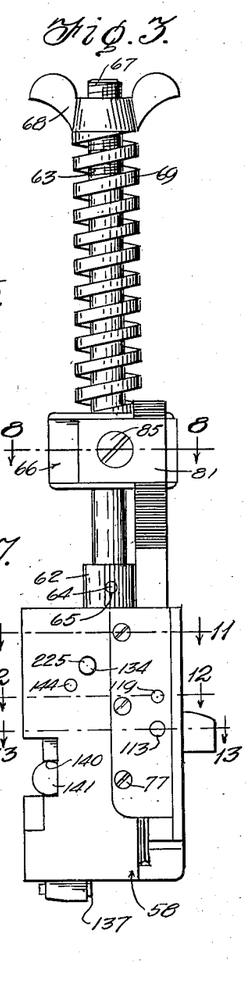
Figure 3 is a side elevation of the stapling device removed from the remainder of the mechanism.
Figure 4:
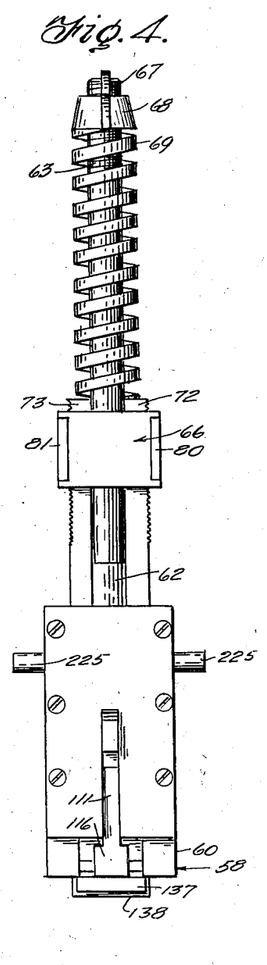
Figure 4 is a front view thereof.
Figure 5:
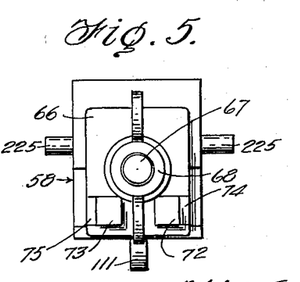
Figure 5 is a plan thereof.
Figure 6:
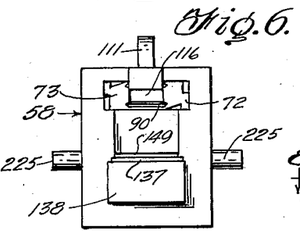
Figure 6 is a bottom plan thereof.
Figure 7:
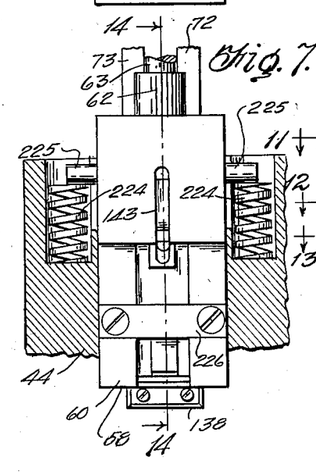
Figure 7 is a fragmentary view from the rear of the stapling device.
Figure 8:
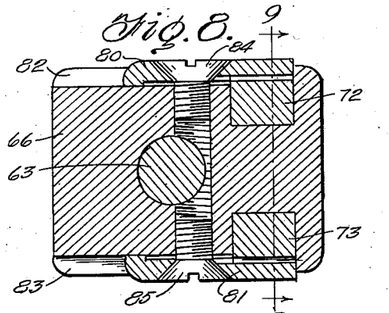
Figure 8 is an enlarged section on line 8—8 of Figure 3.
Figure 9:
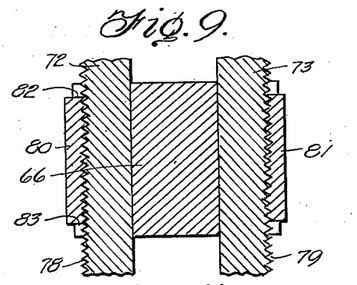
Figure 9 is a detail section on line 9—9 of Figure 8.
Figure 10:
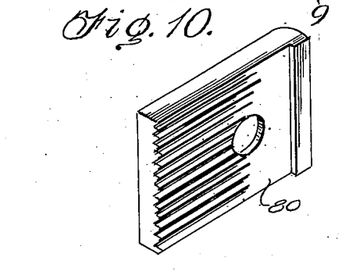
Figure 10 is a detail showing one of the channel clamps.
Figure 11:
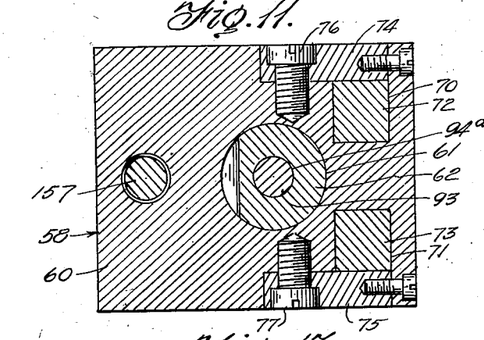
Figure 11 is an enlarged section on line 11—11 of Figure 3.
Figure 12:
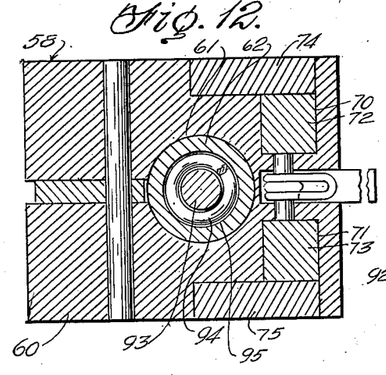
Figure 12 is an enlarged section on line 12—12 of Figure 3.

In the operation of this device, the tape T which is fed to the several heads 58 and 59 is taken from a supply reel (not shown) and passed through the feeding rolls 158 and 159 and through the guide means 164 and 165 to the head 58. The tape T going to the head 59 passes through the guide means 166 and 167. Assuming that the ram or operator 97 is in an uppermost position in which position the operating plate 103 will be as shown in Figures 3 and 4, in this position the operating plate 103 is spaced upwardly from the upper end of the plunger 62. During the initial downward movement of the reciprocating plate 103 under the action of the downward movement of the ram or operator 97, the spring 69 will move the block 66 downwardly so as to move the staple forming bars 72 and 73 downwardly. The downward movement of the staple forming bars 72 and 73 will initially cut off the wire W, the bar 72 in this instance being the cutting bar, and further downward movement of these bars 72 and 73 will bend the opposite ends of the staple S as shown in Figure 19 about the anvil 116. At this time the anvil 116 is in a position beneath staple driver 90 as shown in Figures 14 and 15. At the time the staple S is fully formed the plunger 62 is in contact with the plate 103 so that the plunger 62 starts its downward movement and when the plunger 62 has moved downwardly a distance sufficient to engage the cam member 146 with the upper end of the slot 135 the dog 143 will be swung to a released position permitting the head 58 to move downwardly. At this time the plunger 62 will be in the position shown in Figure 15. The plunger 62 will then continue its downward movement until it reaches the position shown in Figure 16 where the movable cutter 149 has passed the stationary cutter 137 and cut off tab T as shown in Figure 16. At substantially the same time that this is done, the releasing pin 117 will engage the outstanding arm 114 of the rock lever 111 and swing this lever to a released position so that the tensioned plunger 92 may move downwardly so as to drive the staple S through the tab and also through the cap sheet C which is disposed beneath the head 58. When the head 58 moves downwardly the head 58 will be placed under the tension of springs 224 which at their lower ends engage the block 44 in sockets provided for that purpose and their upper ends engage outstanding pins 225. The springs 224 will upon upward movement of the operating member 103 raise the head 58 to the limit permitted by the cut-out portion 226 in one side of the head 58 and through which the pin 141 extends. When the plunger 62 is again raised under the action of the plate 103 engaging the block 66 and tensioning the spring 69, the spring 118 will swing the anvil 116 to an operative position beneath the driver 90 and when the lug 146 confronts the slot 135 the spring 156 will swing the dog 143 to a locked position as shown in Figure 14. In this locked position of the head 58, the head 58 is prevented from downward movement until the staple S has been initially formed during the initial downward movement of the plunger by the recess 133. After the plunger 62 is again in its uppermost position, the pawl 205 will turn the shaft 175 to the desired degree so as to simultaneously feed the desired length of wire W to the head 58 and also turn the tape rolls 158 and 159 so as to move the tape T forwardly for the desired length of tab which will be projected below the lower end of the plunger 62 and the driver 90. When the staple S has been driven through the tab T and the cap sheet C the clincher shaft 130 is rocked by rocking of the crank 131 so as to raise the clincher operating member 124 and swing the clincher dogs 121 to a clinching position as shown in Figure 21.

When it is desired to shift the head 44 the bolt 55 is loosened so as to release the clincher block or slide 53. The screw 46 may then be turned in the desired direction so as to move the block 44. Coincident with the movement of the block 44, the block 53 will move in the same direction through the medium of the swivel connection 50—52 so that in whatever position the block 44 may be moved, the clincher means will be disposed thereneath. The teeth 128 on the clincher shaft or operator 130 are of such a length that plunger or dog operator 124 will at all times engage with the teeth 128.

It will, therefore, be seen that one or more of the stapling or stitching heads may be used or operated from the single operator or ram 97 and that where more than one head is used the several heads may be accurately adjusted relative to each other and to the cap sheet C so as to staple or stitch the tab T in the desired position on the sheet C.

What I claim is:

1. In a closure forming means and in combination, a pair of combined staple forming, staple driving and tab cutting heads, means supporting said heads whereby to permit adjustment thereof relative to each other, a single operating member for said heads, means for feeding a pair of tab strips to said heads, means permitting adjustment of said feeding means in accordance with the adjustment of said heads, means for feeding staple forming wire to said heads, and means permitting adjustment of said latter feeding means in accordance with the adjustment of said heads.

2. In a closure forming means and in combination, a pair of combined staple forming, staple driving and tab cutting heads, means supporting said heads whereby to permit adjustment thereof relative to each other, a single operating member for said heads, means for feeding a pair of tab strips to said heads, means permitting adjustment of said feeding means in accordance with the adjustment of said heads.

3. In a closure forming means and in combination, a pair of combined staple forming, staple driving and tab cutting heads, means supporting said heads whereby to permit adjustment thereof relative to each other, a single operating member for said heads, means for feeding staple forming wire to said heads, and means permitting adjustment of said latter feeding means in accordance with the adjustment of said heads.

4. Tab applying means for applying a tab to a closure disc, said means comprising a head member, a support for supporting said member for vertical movement, said head having a slot transversely of one face thereof, a pin secured to said support extending through said slot, a blade support engaging said pin, said head being slidable relative to said blade support, a stationary blade carried by said blade support, a movable blade carried by said head and coacting with said first blade to cut off a length of tab material, operating means for said head, and means carried by said head operable upon movement thereof in one direction to form and drive a staple through the tab.

5. In a cap forming machine, a pair of combined stapling and tab cutting heads, means for supporting said heads, operating means for said heads, and means for adjusting said heads relative to each other.

6. In a cap forming machine, a pair of combined stapling and tab cutting heads, means for supporting said heads in staggered relation to each other, a single operating means for said heads, and means for adjusting said heads relative to each other.

7. A combined staple forming and tab cutting head, comprising a body member, a plunger slidable in said body, a stationary cutter, a movable cutter carried by said head, a staple forming means carried by said head, means for initially actuating said staple forming means, means for actuating said movable cutter, and spring pressed staple driving means.

8. In a closure forming machine, means for forming and applying a pull tab to a closure comprising a head member, a stationary cutter, means supporting said stationary cutter, a movable cutter, operating means for said movable cutter, a staple forming means carried by said head, operating means for said staple forming means, means holding said movable cutter against movement during operation of said staple forming means, means releasing said holding means at a predetermined moment in the operation of said staple forming means, and means for automatically driving the staple coincident with the cutting of the tab.

9. A combined tab cutting and stitching head comprising means for cutting a tab, means for cutting, forming and driving a staple to secure said tab to a closure cap, means holding said cutting means inactive during the cutting and forming of the staple, and means releasing said cutting means after formation of the staple.

10. In combination a frame structure, a plurality of tab cutting and stitching heads, means supporting said heads on said frame, means for adjusting said heads relative to each other, means supplying wire to each head, means supplying a tab strip to each head, means permitting adjustment of said wire and tab strip supplying means in accordance with the adjustment of said heads, a single operating means for said heads, and means permitting adjustment of said operating means relative to said heads.

11. A tab stitching head comprising a body member, supporting means for said member, a wire cutting member fixed relative to said body member, a pair of spaced apart staple forming bars slidably carried by said body member, operating means for said bars, one of said bars having a cutter portion coacting with said cutting member to cut a length of wire, an anvil disposed between said bars below said cutting member, means swingably supporting said anvil in said body member, means constantly urging said anvil to operative position, coacting means carried by said anvil and said first supporting means to move said anvil to released position, and tensionable driving means active upon movement of said anvil to released position for driving the staple through a tab.

12. A tab stitching head and cutting means comprising a body member, supporting means therefor, a plunger slidably carried by said member, operating means for said plunger, means operable upon movement of said plunger in one direction for cutting a tab, a slide member carried by said plunger, coacting staple forming means carried by said slide member and said body member, tensionable operating means for said slide member, tensionable staple driving means carried by said head, means for tensioning said driving means and means active upon movement of said body member relative to said supporting means for releasing said driving means.

13. A tab stitching head and cutting means comprising a body member, supporting means therefor, a plunger slidably carried by said member, operating means for said plunger, means operable upon movement of said plunger in one direction for cutting a tab, a slide member carried by said plunger, a pair of spaced apart staple forming bars carried by said slide member, a spring pressed lever swingably carried by said body member, an anvil carried by one end of said lever engaging between said bars, a releasing arm carried by said lever, a part carried by said body member engageable with said arm upon movement of said body member relative to said supporting means in one direction for swinging said lever and anvil to released position, and tensionable driving means active upon movement of said anvil to released position for driving the staple through the tab.

14. A tab stitching and cutting means as defined in claim 13 wherein said staple forming bars are provided with staple guide means for guiding the staple during the driving of the staple.

15. A tab stitching and cutting means as defined in claim 13 including means for adjustably securing said bars to said slide member.

16. A tab stitching and cutting means comprising a supporting block provided with an opening therethrough, a stationary cutter in said opening, means securing said cutter in said block, a body member slidable in said opening having a recess in a side thereof to receive said cutter, a movable cutter fixedly carried by said body member, a plunger slidable in said body member, operating means for said plunger, staple forming means carried by said body member, tensionable operating means for said staple forming means, means carried by said body member holding said body member inactive relative to said block until said staple forming means has operated to form a staple, and means for releasing said holding means whereby said body member may move relative to said block to thereby move said movable cutter past said stationary cutter.

17. In a bottle cap machine for operating upon a supply sheet, a guide means carried by said machine, a block slidably engaging said guide means, a combined staple forming, staple driving and tab cutting head slidably carried by said block, a staple clincher means disposed below said block, and means engaging said block and said clincher means for adjusting said head and clincher means relative to the supply sheet.

18. In a bottle cap machine for operating upon a supply sheet, a combined staple forming, staple driving and tab cutting member, means supporting said member for movement toward and away from the sheet, and means engaging said supporting means for adjusting said supporting means in a plane parallel with the surface of the sheet.

19. In a bottle cap machine for operating upon a supply sheet, a combined staple forming, staple driving and tab cutting member, means supporting said member in a manner whereby said member may be laterally adjusted relative to the supply sheet, a tab strip guiding means, means permitting adjustment of said tab strip guiding means in accordance with the adjustment of said member, staple wire guiding means, and means for adjusting said staple wire guiding means in accordance with the adjustment of said member.

20. A means for applying a pull tab to a sheet comprising a frame, a combined tab cutting, staple forming and driving head, a guide means carried by said frame, a slide member engaging said guide means, means slidably mounting said head in said slide member and means engaging said frame and said slide member for adjusting said head relative to said sheet.

21. A pull tab applying means for a disc-shaped closure comprising a body member, a plunger slidable in said body member, a pair of spaced apart staple forming bars carried by said plunger, an anvil swingably carried by said body between said bars, one of said bars being engageable with a wire to initially cut the wire, said cut wire being bent over said anvil upon downward movement of said plunger and said bars, a second plunger slidable in said first plunger, a spring engaging against said second plunger and said first plunger, a driver in said body, means securing said driver to said second plunger, said first plunger having an elongated slot whereby said first plunger may have movement independent of said second plunger, and means engageable with said anvil to swing said anvil to released position whereby said second plunger will be permitted to force said driver downwardly to thereby drive a staple through a tab and closure.

GEORGE J. AHLES.